(12) United States Patent
Jayaraman et al.

(10) Patent No.: US 12,136,330 B1
(45) Date of Patent: Nov. 5, 2024

(54) NECK BAND FOR MOVEMENT SAFETY

(71) Applicant: Amazon Technologies, Inc., Seattle, WA (US)

(72) Inventors: Chandrasekaran Jayaraman, Seattle, WA (US); John Freitag, Seattle, WA (US); Manish Avinash Mantrawadi, Redmond, WA (US); Josh Watson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 78 days.

(21) Appl. No.: 17/945,959

(22) Filed: Sep. 15, 2022

(51) Int. Cl.
*G08B 21/04* (2006.01)
*G06F 3/16* (2006.01)
*G08B 6/00* (2006.01)

(52) U.S. Cl.
CPC ........... *G08B 21/0446* (2013.01); *G06F 3/16* (2013.01); *G08B 6/00* (2013.01); *G08B 21/0453* (2013.01)

(58) Field of Classification Search
CPC .. G08B 21/0446; G08B 6/00; G08B 21/0453; G06F 3/16
USPC ...................................................... 340/573.7
See application file for complete search history.

(56) References Cited

U.S. PATENT DOCUMENTS

| | | | |
|---|---|---|---|
| 2016/0310065 A1* | 10/2016 | Arif ...................... | A61B 5/1116 |
| 2016/0339293 A1* | 11/2016 | Perkins .............. | G01R 33/0206 |
| 2016/0360970 A1* | 12/2016 | Tzvieli ................. | A61B 5/0075 |
| 2017/0238848 A1* | 8/2017 | Goldstein ............. | A61B 5/1116 |
| 2018/0228403 A1* | 8/2018 | Li ........................ | A61B 5/7405 |
| 2021/0007874 A1* | 1/2021 | Galiana Bujanda .... | A61F 5/028 |
| 2021/0093879 A1* | 4/2021 | Dijkstra ............... | A61N 1/3604 |
| 2021/0195732 A1* | 6/2021 | Longinotti-Buitoni ..................... | H05K 3/361 |
| 2022/0183633 A1* | 6/2022 | Kinzie ................... | A61B 5/318 |
| 2024/0028123 A1* | 1/2024 | Yokoyama ......... | G06Q 30/0643 |

* cited by examiner

*Primary Examiner* — Jack K Wang
(74) *Attorney, Agent, or Firm* — Kilpatrick Townsend & Stockton LLP

(57) ABSTRACT

Neck worn devices and related methods monitor posture of a user, activity of the user, and/or an environment of the user and provide feedback. A neck worn monitoring device includes a support frame, a feedback assembly, one or more sensors, and a control unit. The feedback assembly is operable to output feedback. The one or more sensors are configured to generate one or more sensor outputs indicative of at least one of a posture of the user, an activity of the user, or an environment of the user. The control unit is configured to process the one or more sensor outputs to monitor at least one of the posture, the activity, or the environment, and operate the feedback assembly to transmit a feedback indicative of at least one of the posture, the activity, or the environment.

19 Claims, 9 Drawing Sheets

US 12,136,330 B1

NECK BAND FOR MOVEMENT SAFETY

BACKGROUND

Excess strain and tension is applied to the body in nonergonomic positions. Bad posture can lead to overall pain and discomfort in addition to further health issues if left untreated. For example, poor posture can lead to pelvic floor dysfunction, acid reflux and heartburn, cervicogenic headaches, among other ailments. Neutral posture (e.g., the spine's natural alignment position), includes standing or sitting tall with shoulders down and back, and head level without tilting the neck.

BRIEF DESCRIPTION OF THE DRAWINGS

Various embodiments in accordance with the present disclosure will be described with reference to the drawings, in which.

Figure 1:
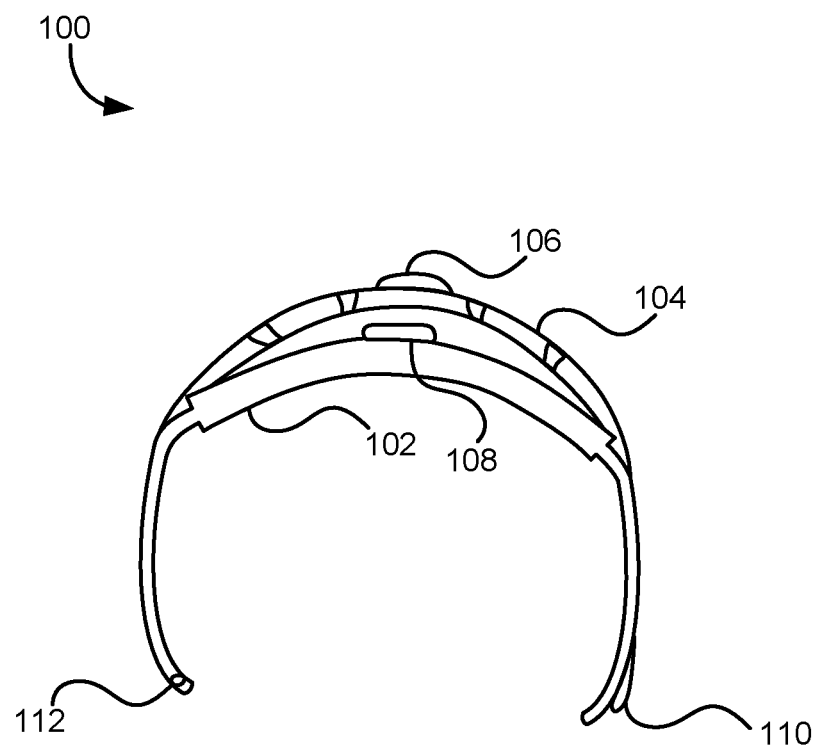
FIG. 1 is an isometric view of a neck worn monitoring device, in accordance with one aspect of the present disclosure.

The structures depicted in the figures are not necessarily according to scale.

Furthermore, the proportionality of one component to another may change with different implementations. In some illustrations the scale or a proportionate size of one structure may be exaggerated with respect to another to facilitate illustration, and not necessarily as a limitation.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Various embodiments of the present disclosure include methods and devices for monitoring posture. Correct posture and movement safety are important aspects of maintaining one's overall health. At least some aspects described herein include a neck worn monitoring device having sensors for tracking body posture and body movement. The neck worn monitoring device preferably provides alerts in response to detecting bad posture to prevent and/or reduce injury.

Techniques described herein include a wearable smart-neck band device provided with a skin compliant suspension flexible neck engagement member coupled to a support frame. In preferred embodiments, haptic feedback assemblies are provided with the neck worn monitoring device for providing haptic feedback in the event a parameter associated with posture is exceeded. In at least some further embodiments, additional sensors may be coupled to the neck worn monitoring device for providing additional information associated with a user of the neck worn monitoring device.

A neck worn monitoring device may be used to provide a variety of functions to a user. These functions may include providing information, acquiring data using sensors, providing haptic feedback, etc. The neck worn monitoring device may operate alone or may utilize a communication link to operate in conjunction with another user device such as a smart phone, tablet, desktop, etc. Additional user devices may be used as supporting devices which provide additional sensor data, additional output features, additional input features, additional processing capabilities, etc.

The neck worn monitoring device may include output devices such as a haptic feedback assembly which is operable to output haptic feedback to the user, a speaker to provide audio output, a light emitting diode (LED) to provide a visual indicator, etc.

The neck worn monitoring device may include input devices such as a microphone which allows the user to provide speech input to an application running on a smart phone in communication with the neck worn monitoring device.

In at least some aspects, a neck worn monitoring device as described herein may be used to remind a user to adjust their posture when element(s) of their posture exceed predetermined threshold(s). For example, the neck worn monitoring device may alert a user in response to detecting that the user's posture is unsafe and/or the unsafe posture subsists for a predetermined period of time.

Various aspects of the present disclosure include at least one haptic feedback assembly coupled to the neck worn monitoring device. In at least some approaches, a plurality of haptic feedback assemblies is included with the neck worn monitoring device for providing localized feedback with respect to detected posture. For example, the neck worn monitoring device may provide haptic feedback, via the at least one haptic feedback assembly, on the left side of the neck worn monitoring device to alert the user that the left side of the user's body is in an unsafe position and/or has been in an unsafe position for a predetermined period of time.

FIG. 1 is an isometric view of a neck worn monitoring device 100, in accordance with one aspect of the present disclosure. The neck worn monitoring device 100 includes a flexible neck engagement member 102 mounted to a support frame 104. The neck worn monitoring device 100 further includes a control unit 106 mounted to the flexible neck engagement member 102 or mounted to the support frame 104 (as shown). The neck worn monitoring device 100 includes at least one sensor 108 and a feedback assembly 110. In various embodiments, the neck worn monitoring device may include at least one additional sensor 112.

In at least some aspects, the flexible neck engagement member 102 includes at least one skin compliant material. The skin compliant material may include any material which forms to the shape of the skin for producing a comfortable fit for a user. Examples of skin compliant materials include fabric, foam, leather, etc., or any combination thereof.

In various aspects, the flexible neck engagement member 102 mounted to the support frame 104 is configured to engage a back region of the neck when the neck worn monitoring device 100 is worn around the neck. In preferred aspects, the flexible neck engagement member 102 registers with at least half of the neck of a user. For example, the flexible neck engagement member 102 is preferably in contact with the neck substantially continuously along at least a portion of the circumference of the neck.

The flexible neck engagement member 102 is configured to accommodate movement of the neck relative to the support frame 104. The flexible neck engagement member 102 preferably isolates neck movement from torso movement of a user of the neck worn monitoring device 100. For example, the skin compliant material of the flexible neck engagement member 102 functions to absorb torso movement such that any sensors on the support frame 104 (e.g., such as sensor 108, to be described in detail below) do not pick up substantially any neck movement, and vice versa. For example, the flexible neck engagement member 102 may comprise a sensor 108 of the same type as the sensor 108 on the support frame 104. The flexible neck engagement member 102 and the support frame 104 are isolated from each other such that sensors coupled to respective components substantially do not sense movement from the other components. In other approaches, the support frame 104 isolates torso movement from neck movement of a user wearing the neck worn monitoring device 100.

The flexible neck engagement member 102 may optionally include a spring mechanism and/or a spring-like mechanism for coupling the flexible neck engagement member 102 of the neck worn monitoring device 100 to the support frame 104 of the neck worn monitoring device 100. In some approaches, a spring mechanism and/or a spring-like mechanism is used to isolate the flexible neck engagement member 102 of the neck worn monitoring device 100 from the support frame 104 of the neck worn monitoring device 100.

In various aspects, the support frame 104 is a metal support frame. The support frame 104 directs haptic feedback to a user from a haptic feedback assembly (e.g., such as feedback assembly 110, to be described in detail below). In preferred aspects, the support frame 104 is characterized as having a tuned material resonance which enables haptic energy to be transferred throughout the support frame 104 or to at least portions of the support frame 104.

In preferred aspects, the support frame 104 is shaped to be worn around a neck of a user. The support frame 104 rests naturally on the torso of a user, e.g., along the back of the neck, shoulders, collarbones, etc., such that the metal frame does not transmit any detectable force to any sensors coupled to the flexible neck engagement member 102. For example, the support frame 104 registers with the body of a user substantially along the entire length of the support frame 104.

The support frame 104 may be modularly built for haptics customization. In various approaches, the support frame may be built from a plurality of parts (e.g., portions) and/or comprises a plurality of haptic nodes (e.g., haptic feedback assemblies) placed at distinct locations around the support frame 104 of the neck worn monitoring device 100. For example, a first haptic node may be located on the left side of the neck worn monitoring device 100 and a second haptic node may be located on the right side of the neck worn monitoring device 100. In another example, a third haptic node may be located on the back side of the neck worn monitoring device 100 (e.g., along a portion of the support frame 104 which traverses the back of the neck of a user).

Specifically, the neck worn monitoring device 100 may include at least two feedback assemblies 110 located at distinct locations on the support frame 104. In other approaches, a plurality of feedback assemblies 110 may be located on the flexible neck engagement member 102 of the neck worn monitoring device 100.

In another modular example, the support frame 104 is made from different materials located along different portions of the support frame. The support frame 104 may have a plurality of tuned material resonances (e.g., resonant frequencies) throughout the support frame 104, according to this approach. In one exemplary aspect, the support frame 104 may comprise a back portion which generally corresponds to the back of the neck where the back portion is made of a first material and the support frame 104 also comprises two side portions located on each side of the back portion and made of a second material. The first and second materials may have different stiffnesses, compositions, densities, resonant frequencies, etc., or any combination thereof. In another exemplary aspect, a left side portion of the support frame 104 may comprise a different material than a right side portion of the support frame 104. For example, portions of the support frame 104 having different stiffnesses are characterized as having different resonant frequencies.

In each approach, the plurality of sections and/or the plurality of feedback assemblies provide specific and targeted feedback for correction of the posture of a user. For example, in response to detecting an exceedance of a torso orientation limit on the left side of the body, the haptic nodes on the left side of the body user may provide haptic feedback and the haptic nodes on the right side of the body of the user do not provide any haptic feedback.

A control unit 106 is configured to process the one or more sensors 108 output to monitor posture of the user, activity of the user, the environment of the user, etc. The control unit is configured to operate the feedback assembly 110 (to be described in further detail below) to transmit, to the user, a feedback indicative of the posture of the user, the activity of the user, the environment of the user, etc. According to at least some approaches, a control unit 106 is mounted to the support frame 104 and includes an inertial measurement unit (IMU) configured to generate one or more torso IMU output signals indicative of movement of a torso of the user. An IMU coupled to the support frame 104 may be interchangeably referred to as an upper torso IMU. Similarly, an IMU coupled to the neck engagement member 102 may be interchangeably referred to as a neck IMU. In some aspects, the IMU may be a sensor 108 which is part of the control unit 106. In other aspects, the IMU is integrated with and/or is a component of the control unit 106. The IMU may include any combination of components including an accelerometer, a magnetometer, a gyroscope, etc. IMU output signals may be indicative of posture and/or activity of the user including a velocity, angle, acceleration, etc., or any combination thereof, of a user. In preferred approaches, the IMU includes at least an accelerometer and output signals which are indicative of at least acceleration.

In at least some aspects, a control unit 106 includes on-board processing for processing signals (e.g., sensor data) and providing haptic feedback (e.g., real-time haptic feedback) based at least in part on the processed signals. In various approaches, additional processing may occur via Bluetooth, Wi-Fi, or any other wireless communication means, or any combination thereof. Various back-end metrics gathering may be server-based and/or cloud-based, in at least some approaches. Similarly, personal level data tracking may be server-based and/or cloud-based and preferably cloud-based via a smart phone interface or other supporting user device in communication with the neck worn monitoring device.

In various implementations, the control unit 106 is configured to process one or more torso IMU output signals to monitor an orientation of the torso for occurrence of the orientation of the torso exceeding a torso orientation limit. Similarly, the control unit 106 is configured to process one or more neck IMU output signals to monitor an orientation of the neck for occurrence of the orientation of the neck exceeding a neck orientation limit. In various approaches, the control unit 106 is configured to process neck and torso IMU output signals and orientations to monitor a neck to torso relative orientation for occurrence of the neck to torso relative orientation exceeding a neck to torso relative orientation limit, etc. The control unit 106 may detect an occurrence of an exceedance of the limit, according to any of the aspects described in detail below with respect to process 300, 400, 500, 600, etc. In response to detecting the occurrence of the exceedance of the limit, the control unit 106 may operate the feedback assembly 110 to generate feedback that is transmitted to the user. In one aspect, torso feedback is generated where the torso orientation feedback is indicative of the occurrence of the exceedance of the torso orientation limit by the orientation of the torso. In preferred aspects, the torso orientation feedback is the haptic feedback output by the feedback assemblies 110.

In preferred approaches, the control unit 106 includes and/or is in communication with a machine learning unit/artificial intelligence unit. A machine learning unit/artificial intelligence unit may record and/or predict data obtained from the at least one sensor, as described further below. The machine learning unit/artificial intelligence unit may be of a type known in the art. In at least some approaches, the machine learning unit/artificial intelligence unit may be used to set various of the limits described with respect to process 300, 400, 500, 600, etc., to be described in detail below.

In various aspects, the neck worn monitoring device 100 includes at least one sensor 108. Each sensor 108 is configured to generate one or more sensor outputs indicative of at least one of posture of the user, an activity of the user, or an environment of the user. The sensor 108 may be any of an accelerometer, a magnetometer, a gyroscope, etc. The sensor 108 may be coupled to the flexible neck engagement member 102 and/or the support frame 104. In some approaches, the sensor 108 may be part of the control unit 106. The flexible neck engagement member 102 and/or the support frame 104 may comprise a plurality of sensors, the plurality of sensors comprising any combination of sensors described herein.

In preferred aspects, the sensor 108 detects at least one parameter associated with posture. Parameters associated with posture includes any of an orientation, a cervical angle, a duration, a repetition, a velocity, an angular velocity, etc. The sensor 108 may gather, receive, send, record, etc., or any combination thereof, sensor data. For example, sensor data including a cervical angle and a velocity may be associated with bending movements. In another example, sensor data including angular velocity may be associated with twisting movements.

In some aspects, a sensor window (not shown) may be arranged on a surface of the neck worn monitoring device 100 for skin contact. For example, the sensor window may be transparent to one or more wavelengths of light such as visible and/or infrared light. The sensor window may be used by any of the sensors described herein to obtain sensor data as would be apparent to one having ordinary skill in the art. A field of view of the sensors may pass through the sensor window. For example, an optical heart rate monitor may comprise an LED that emits light which passes through the sensor window and to the skin of the user. Reflected or scattered light returns through the sensor window where it is measured by a photodetector sensor.

In at least some aspects, the neck worn monitoring device 100 includes at least one feedback assembly 110. The feedback assembly 110 is operable to output feedback to the user. The feedback assembly 110 may be a type known in the art including any kinesthetic communication device which provides forces and/or vibrations. The feedback assembly 110 is operable to output torso feedback, torso orientation feedback, neck orientation feedback, neck to torso relative orientation feedback, etc., in the form of haptic feedback at one or more locations along the neck worn monitoring device 100. The feedback assembly 110 may be a haptic feedback assembly including a cylindrical vibration motor, a Q-coin vibration motor, a large vibration motor, a printed circuit board (PCB) coin vibration motor, a pancake vibration motor, an enclosed vibration motor, a linear resonant actuator (LRA), a piezo actuator, an eccentric rotating mass motor, a pager motor, a PCB mounted vibrator, etc. In preferred aspects, the feedback assembly 110 includes a haptic engine which provides a resonant frequency between at least 150 Hz to at least 300 Hz. In further preferred aspects, the feedback assembly 110 is a haptic engine which provides a resonant frequency of at least 250 Hz.

In preferred aspects, the feedback assembly 110 outputs haptic feedback in response to detecting the occurrence of the exceedance of a limit, according to at least some of the aspects described below in process 300, 400, 500, 600, etc. In further preferred aspects, the feedback assembly 110 outputs the haptic feedback in real-time in response to detecting the occurrence.

In various approaches, the feedback assembly 110 may be located on the flexible neck engagement member 102 and/or the support frame 104. A plurality of feedback assemblies 110 may be located along the flexible neck engagement member 102 and/or the support frame 104, as described above, to provide modular haptic feedback, in at least some approaches.

In various aspects, the neck worn monitoring device 100 includes at least one additional sensor 112 for outputting one or more additional signals. The additional sensor 112 may be a photoplethysmography sensor, an electrocardiogram sensor, an ionization detector, a photoelectric detector, a blood pressure sensor, a heart rate sensor, a temperature sensor, a galvanic skin response (GSR) sensor, a microphone, a global positioning system (GPS) sensor, strain gauges, anti-tamper indicators, etc., or any combination thereof. The additional sensor 112 may be located anywhere on the neck worn monitoring device 100 including on the flexible neck engagement member 102 and/or on the support frame 104. The neck worn monitoring device 100 may include a plurality of additional sensors 112 including any combination of sensors described herein.

For example, the additional sensor 112 may be a heart rate sensor which measures heart rate data. The additional sensor 112 may be a location sensor such as a GPS sensor which provides location data. Location data may be relative or absolute. For example, a relative location may indicate a room, such as a "kitchen," etc.

In various aspects, additional accessories (not shown) may be integrated with and/or coupled to the neck worn monitoring device 100. Additional accessories may include audio speakers, headphones, a fan, a mister, etc. In at least some approaches, the control unit 106 is configured to operate any of the additional accessories in response to audio input and/or exceedance of a limit described herein. For example, the control unit 106 may operate the fan in response to detecting the temperature of the environment is above a predetermined limit and/or in response to detecting the temperature of the user is above a predetermined limit. In another example, the control unit 106 may operate the speakers to output audio output warning the user that the user's posture exceeds a predetermined limit, in response to detecting the exceedance of the limit.

In some approaches, the neck worn monitoring device 100 may include a display device (not shown) to provide visual output to the user. In other approaches, the neck worn monitoring device 100 is in communication with a user device having a display device to provide visual output to the user.

A battery (not shown) may be coupled to the neck worn monitoring device 100. The battery may be used to provide electrical power to the components of the neck worn monitoring device 100. The battery may be rechargeable. A battery contact block may provide electrical connections between contacts on the battery and the electronics of the neck worn monitoring device 100. A flexible printed circuit (FPC) may provide one or more electrical traces to transfer one or more of power or data between components of the neck worn monitoring device 100.

Figure 2:
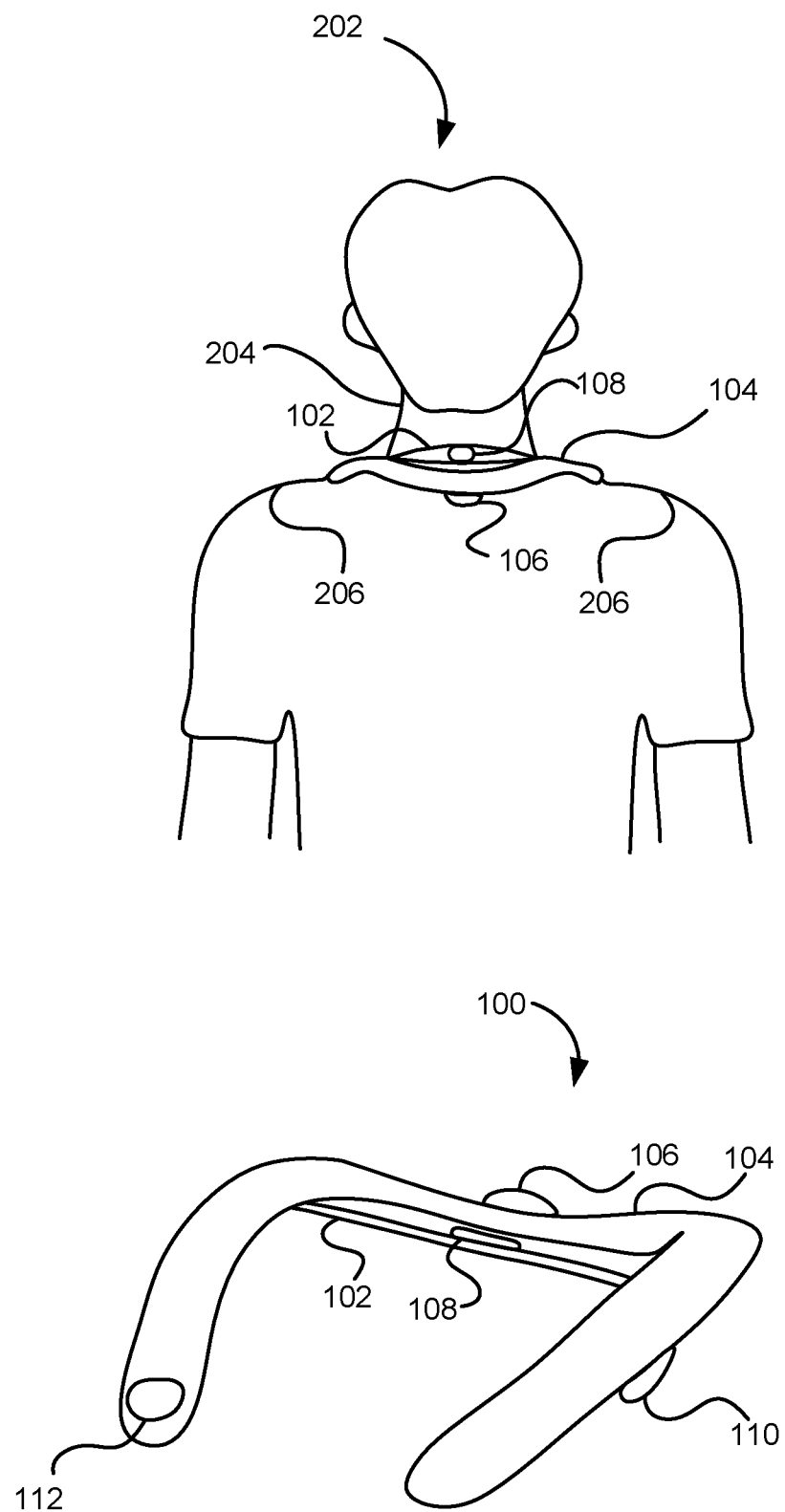
FIG. 2 is an exemplary view of the neck worn monitoring device of FIG. 1 on a user, in accordance with one aspect of the present disclosure.

FIG. 2 is an exemplary view of the neck worn monitoring device 100 described with respect to FIG. 1 on a user 202. The flexible neck engagement member 102 is mounted to the support frame 104 and configured to engage a back region of the neck 204 of the user 202. As shown, the support frame 104 conforms to the shoulders 206 of the user 202. In various approaches, the neck worn monitoring device 100 comprises materials configured to adjust the fit of the neck worn monitoring device 100 to the back region of the neck 204 and/or the shoulders 206 of the user 202.

Figure 3:
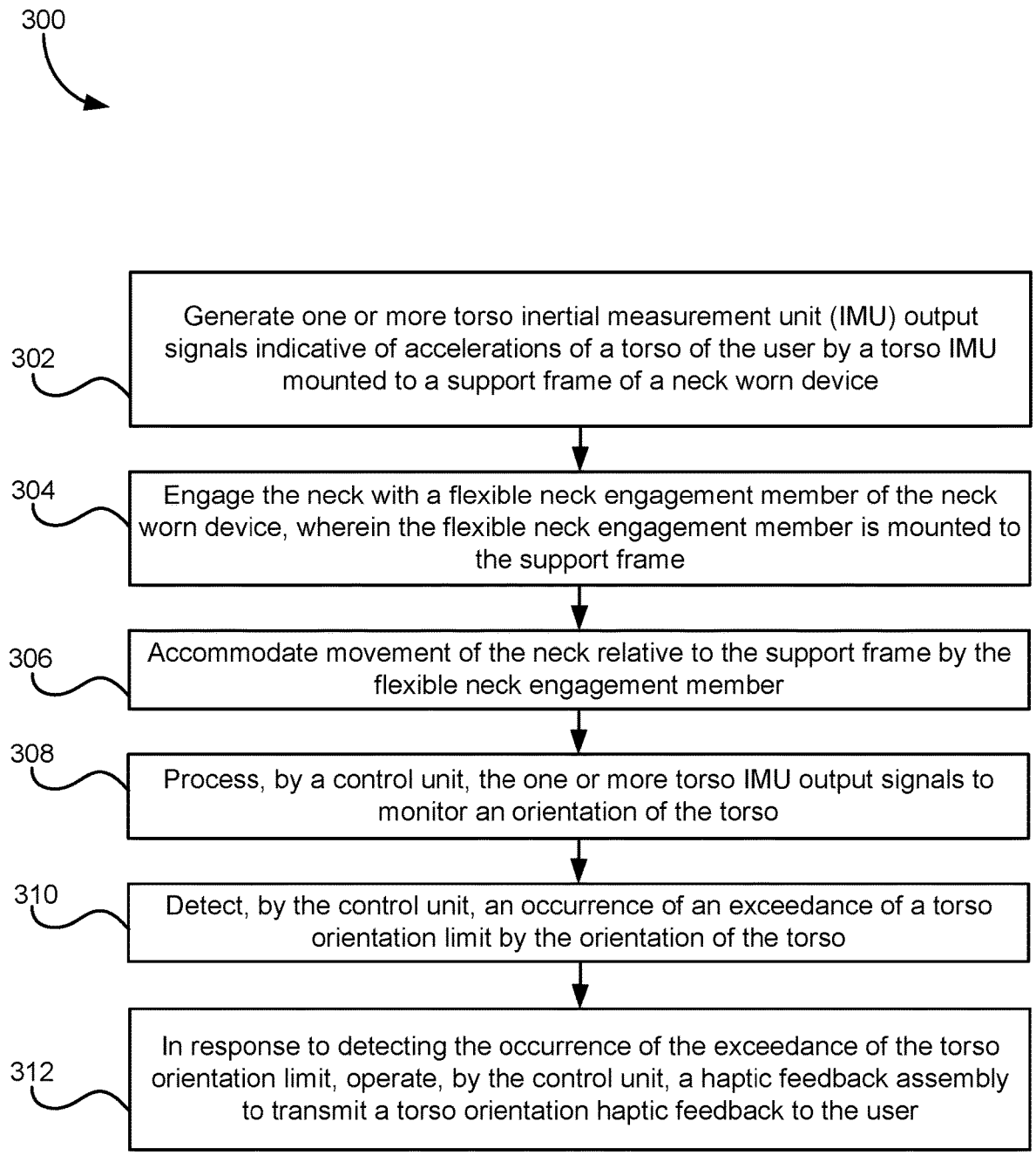
FIG. 3 is a flowchart of a method, in accordance with one aspect of the present disclosure.

FIG. 3 is a flowchart of process 300 for providing haptic feedback to a user regarding a posture and/or an activity of the user. Process 300 may include more or less operations that those shown. At least some of the aspects described with respect to process 300 may be performed by the neck worn monitoring device 100 described in detail with reference to FIG. 1.

Process 300 includes operation 302. Operation 302 includes generating one or more torso IMU output signals indicative of movement of a torso of the user by a torso IMU mounted to a support frame of a neck work device. For example, the output signals (e.g., sensor outputs) may be indicative of accelerations of the torso of the user by an accelerometer of the IMU in each of three axes while the support frame is interfaced with regions of the torso and extends at least partially around a neck of the user. In preferred aspects, the three axes refer to the sagittal plane, the medial-lateral plane, and the posterior-anterior planes associated with movement. For example, movement may include bending to the left, bending to the right, bending forward, bending backward, etc. Movement may be absolute or relative. For example, absolute movement may be measured with respect to a fixed reference frame where neck and torso movement produce independent sensor outputs and calculations. Relative movement may be measured with respect to a local frame such that neck and torso movement is produce sensor outputs and calculations which are relative to one another. The three axes may refer to the x, y, and z direction, as would be understood by one having ordinary skill in the art. In various approaches, the neck worn device corresponds to the neck worn monitoring device 100 described in detail with reference to FIG. 1 and is worn according to at least some of the description of FIG. 2. The torso IMU output signals may be generated by movement of the user.

The torso IMU may include a piezoelectric accelerometer, a piezoresistance accelerometer, a capacitive accelerometer, etc. The torso IMU is configured to measure acceleration forces associated with torso movement of the user and may be used to determine the torso's position (e.g., the neck worn monitoring device's position) in space.

Operation 304 includes engaging the neck with a flexible neck engagement member of the neck worn device, wherein the flexible neck engagement member is mounted to the support frame. The flexible neck engagement member of the neck worn device is configured to conform to the shape of neck, according to various aspects described herein. The support frame is similarly configured to conform to the shape of a user's shoulders and/or torso as shown in FIG. 2. In various approaches, the support frame is at least semi-rigid. The support frame may comprise conformable materials for adjusting the fit of the support frame to the torso and/or the shoulders of the user, in at least some implementations.

Operation 306 includes accommodating movement of the neck relative to the support frame by the flexible neck engagement member. Accommodating movement of the neck relative to the support frame by the flexible neck engagement member includes isolating neck movement and torso movement. In preferred approaches, the flexible neck engagement member includes skin compliant material for absorbing excess energy from the torso. In other approaches, the flexible neck engagement member includes a spring and/or a spring like mechanism for isolating movement of the neck relative to the support frame.

Operation 308 includes processing, by a control unit, the one or more torso IMU output signals to monitor an orientation of the torso. The control unit is preferably mounted to the support frame. In other aspects, the control unit may be mounted to the flexible engagement member. The output signals are monitored for occurrence of the orientation of the torso exceeding a torso orientation limit. The one or more torso IMU output signals may be received at the control unit of the neck worn monitoring device in at least some approaches. In other approaches, the one or more torso IMU output signals may be received via Bluetooth and/or Wi-Fi at an external control unit in any manner known in the art. In preferred aspects, torso IMU output signals are received at predetermined intervals. For example, the torso IMU output signals may be received substantially continuously, periodically, randomly, etc.

Operation 310 includes detecting, by the control unit, an occurrence of an exceedance of the torso orientation limit by the orientation of the torso. The control unit is configured to process the output signals and determine whether the limit has been exceeded. For example, a determination that a torso orientation exceeds a predetermined limit may include determining that the orientation of the torso is greater than 45 degrees from a plane perpendicular to the ground. In another example, a determination that a torso orientation exceeds a predetermined limit may include determining that the orientation of the torso is greater than 30 degrees from a plane perpendicular to the ground for more than 5 minutes. A limit may be exceeded as the torso orientation meets or exceeds predetermined limit values.

The torso orientation limit may be predetermined by a user, a supplier, a manufacturer, etc. In at least some approaches, a user profile associated with the neck worn monitoring device includes vital statistics of a user such as height, weight, age, sex, etc., which may influence the torso orientation limit. Any limit may be adjustable. In at least some approaches, a machine learning unit/artificial intelligence unit adjusts at least one limit based on the user profile including the user, an occupation of the user, user habits, user environment, etc., or any combination thereof, to be disclosed in further detail below.

Operation 312 includes, in response to detecting the occurrence of the exceedance of the torso orientation limit, operating, by the control unit, a haptic feedback assembly to transmit a torso orientation haptic feedback to the user. The torso orientation feedback is indicative of the occurrence of the exceedance of the torso orientation limit by the orientation of the torso. The haptic feedback assembly comprises a haptic feedback mechanism that generates haptic feedback that is transmitted to the user through the support frame in response to detecting the occurrence of the exceedance of the torso orientation limit by the orientation of the torso.

In at least some aspects, the process 300 includes processing, by the control unit, the one or more torso IMU output signals and/or the one or more neck IMU output signals to generate activity data (e.g., physical activity, physiological activity, etc.) for the user indicative of an activity level of the user over a time span. For example, the activity data comprises heart rate data for the user.

The neck worn monitoring device includes at least one haptic feedback assembly and preferably includes a plurality of haptic feedback assemblies, as described in detail with respect to FIG. 1. The haptic feedback assemblies output haptic feedback. For example, in response to the control unit of the neck worn monitoring device determining that a limit has been exceeded, the haptic feedback assemblies output haptic feedback in real-time to a user.

Figure 4:
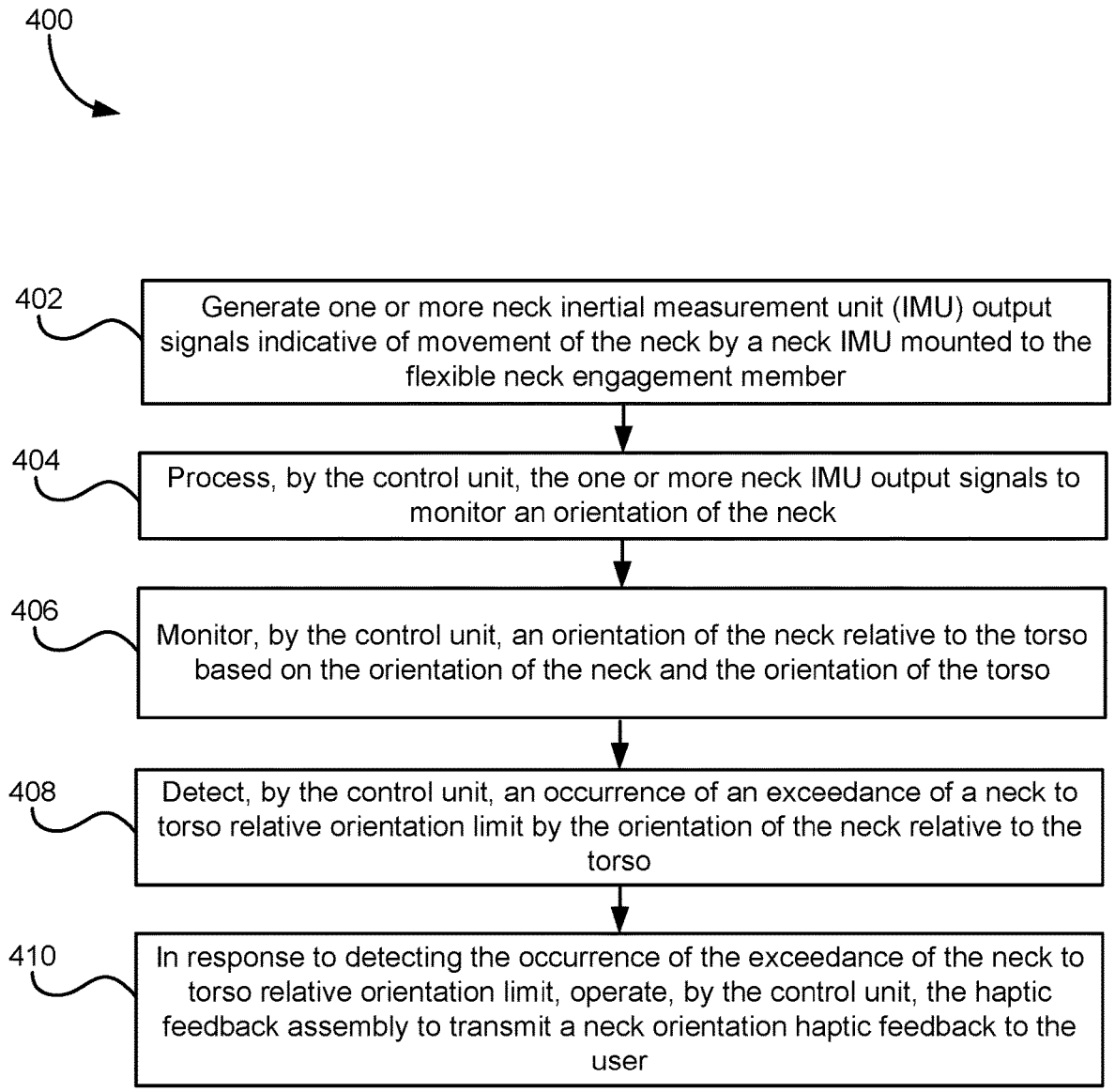
FIG. 4 is a flowchart of a method, in accordance with one aspect of the present disclosure.

FIG. 4 is a flowchart of process 400 for providing feedback to a user regarding a posture and/or an activity of the user. Process 400 may include more or less operations that those shown. At least some of the aspects described with respect to process 400 may be performed by the neck worn monitoring device 100 described in detail with reference to FIG. 1.

Process 400 includes operation 402. Operation 402 includes generating one or more neck IMU output signals indicative of movement of the neck by a neck IMU mounted to the flexible neck engagement member. In preferred aspects, the three axes refer to the sagittal plane, the medial-lateral plane, and the posterior-anterior planes associated with movement. For example, movement may include bending to the left, bending to the right, bending forward, bending backward, etc. Movement may be absolute or relative. For example, absolute movement may be measured with respect to a fixed reference frame where neck and torso movement produce independent sensor outputs and calculations. Relative movement may be measured with respect to a local frame such that neck and torso movement is produce sensor outputs and calculations which are relative to one another. The output signals (e.g., sensor outputs) may include neck acceleration signals of the neck in each of three axes (e.g., x, y, and z). An additional IMU may be mounted to the flexible neck engagement member, in addition to the torso IMU described in operation 302 of process 300. The neck IMU may be of the same type as the torso IMU or the neck IMU may be of a different type. Movement of the neck generates neck IMU output signals which may be different from the torso IMU output signals.

Operation 404 includes processing, by the control unit, the one or more neck IMU output signals to monitor an orientation of the neck. The control unit is preferably mounted to the support frame. In other aspects, the control unit may be mounted to the flexible engagement member. The one or more neck IMU output signals may be received at the control unit of the neck worn monitoring device in at least some approaches. In other approaches, the one or more neck IMU output signals may be received via Bluetooth and/or Wi-Fi at an external control unit in any manner known in the art. In preferred aspects, neck IMU output signals are received at predetermined intervals. For example, the neck IMU output signals may be received substantially continuously, periodically, randomly, etc.

Operation 406 includes monitoring, by the control unit, an orientation of the neck relative to the torso, based on the orientation of the neck and the orientation of the torso. The orientation of the neck relative to the torso (or vice versa) may be monitored for occurrence of the orientation of the neck relative to the torso exceeding a neck to torso relative orientation limit. In various approaches, an orientation of the neck is determined via output signals from the neck IMU. Similarly, an orientation of the torso is determined via output signals from the torso IMU. The orientations may be compared at any predetermined interval in order to determine whether a relative orientation limit is exceeded.

Operation 408 includes detecting, by the control unit, an occurrence of an exceedance of a neck to torso relative orientation limit by the orientation of the neck relative to the torso. The control unit is configured to process the output signals and determine whether the limit has been exceeded. For example, a determination that a neck relative to torso orientation exceeds a predetermined limit may include determining that the relative orientation of the neck to torso is greater than 45 degrees from a plane perpendicular to the ground. In another example, a determination that a neck to torso relative orientation exceeds a predetermined limit may include determining that the relative orientation of the neck to torso is greater than 30 degrees from a plane perpendicular to the ground for more than 5 minutes. A limit may be exceeded as the neck to torso relative orientation meets or exceeds predetermined limit values.

The neck to torso relative orientation limit may be predetermined by a user, a supplier, a manufacturer, etc. In at least some approaches, a user profile associated with the neck worn monitoring device includes vital statistics of a user such as height, weight, age, sex, etc., which may influence the neck to torso relative orientation limit. Any limit may be adjustable. In at least some approaches, a machine learning unit/artificial intelligence unit adjusts at least one limit based on the user profile including the user, an occupation of the user, user habits, user environment, etc., or any combination thereof, to be disclosed in further detail below.

Operation 410 includes, in response to detecting the occurrence of the exceedance of the neck to torso relative orientation limit, operating, by the control unit, the haptic feedback assembly to transmit a neck orientation haptic feedback to the user. The neck orientation feedback is indicative of the occurrence of the exceedance of the neck to torso relative orientation limit by the orientation of the neck relative to the torso. The haptic feedback assembly comprises a haptic feedback mechanism that generates haptic feedback that is transmitted to the user through the support frame in response to detecting the occurrence of the exceedance of the torso orientation limit by the orientation of the torso.

The neck worn monitoring device includes at least one haptic feedback assembly and preferably includes a plurality of haptic feedback assemblies, as described in detail with respect to FIG. 1. The haptic feedback assemblies output haptic feedback in a manner known in the art. For example, in response to the control unit of the neck worn monitoring device determining that a limit has been exceeded, the haptic feedback assemblies output haptic feedback in real-time to a user. A user preferably adjusts the neck and/or torso orientation in response to the feedback.

In various approaches, any of the processes described herein optionally include processing, by the control unit, one or more output signals to generate activity data (e.g., physical activity data, physiological activity data, etc.) for the user indicative of an activity level of the user over a time span. The activity data may be transmitted, by the control unit, to a remote device. The remote device may be a user device including a phone, a tablet, a computer, etc. For example, the activity data may comprise heart rate data for the user generated by a heart rate sensor of the neck worn device. A heart rate signal may be indicative of a heart rate of the user and the control unit may process the heart rate data for the user indicative of the heart rate of the user over a time span. The heart rate sensor may be a photoplethysmography sensor, in at least some approaches.

In other approaches, the control unit may process output signals (e.g., sensor outputs) from additional sensors coupled to the neck worn device. Additional sensors may include an ionization detector, a photoelectric detector, a blood pressure sensor, a heart rate sensor, an electrocardiogram sensor, a temperature sensor, a galvanic skin response (GSR) sensor, a microphone, a global positioning system (GPS) sensor, strain gauges, anti-tamper indicators, etc., or any combination thereof. Additional sensor data may be received in an analogous manner as the torso orientation IMU output signals and the neck IMU output signals.

In other approaches, the control unit may be configured to process additional types of data, including but not limited to, audio input data, air quality data, location data (e.g., of the neck worn monitoring device), etc., or any combination thereof. The control unit may be configured to output audio data and/or torso feedback to the user based at least in part on data received from any sensors. For example, the additional types of data may include location data of the neck worn monitoring device and the neck worn monitoring device may output (via a speaker system known in the art) directions. Specifically, the neck worn monitoring device may narrate directions based on GPS data received from a GPS sensor coupled to the neck worn monitoring device. In another example, additional data may be heart rate data and the neck worn monitoring device may output a verbal report of the heart rate data. Specifically, the neck worn monitoring device may output audio data indicating the heart rate data (e.g., the second data) is approaching the anaerobic zone, the aerobic zone, etc.

In at least some aspects, the additional types of data include audio input detected by the neck worn monitoring device and the output audio data is instructions based on the audio input. The control unit is preferably configured to process audio input and provide feedback via the haptic feedback assembly. In an exemplary approach, the audio input originates from the user of the neck worn monitoring device and the neck worn monitoring device includes a "smart" component which responds to the audio input. For example, a user may ask the device for information (e.g., directions) and the neck worn monitoring device may output the corresponding directions as discussed above.

In various aspects, the neck worn monitoring device interfaces with a user device (e.g., a mobile phone, tablet, desktop, etc.) and corresponding alerts may be output to the user device. In some approaches, a user may access posture data via a user device interface. In at least some approaches, a user device may include sensors and the user device provides the neck worn monitoring device with additional sensor data.

In some approaches, any of the processes described herein optionally include determining, by the computer, based on output signals (e.g., sensor outputs), whether a second limit (e.g., a torso orientation limit, a neck orientation limit, a neck to torso relative orientation limit, etc.) has been exceeded. A second limit may include a longer period of time than a first limit, a higher speed acceleration than a first limit, etc., or any combination thereof. In response to determining that the second limit has been exceeded, any of the processes described herein may optionally include outputting modified haptic feedback and/or an audio warning via the neck worn monitoring device to be transmitted to the user. In one example, in response to determining that a time under bad posture extends a predetermined time period over the initial limit, the neck worn monitoring device (via haptic feedback assemblies coupled thereto) may output a different haptic frequency and/or an audio warning may be output via speakers coupled to the neck worn monitoring device.

In various approaches, any of the processes described herein optionally include recording, by the computer, historical data associated with any of the output signals from any of the sensors. The data may be recorded in any manner known in the art. For example, the data may be recorded in a table in memory associated with the neck worn monitoring device.

Any of the processes described herein further optionally include analyzing gathered data using a machine learning unit/artificial intelligence unit of the control unit and/or a machine learning unit/artificial intelligence unit integrated with and/or connected to the neck worn monitoring device. The data may be analyzed by the machine learning unit/artificial intelligence unit in a manner known in the art to determine patterns, make predictions, provide adjustments, etc. In preferred aspects, the machine learning unit/artificial intelligence unit discounts operation tasks of a user and only provides feedback on movement which exceeds the pre-defined limits as described herein. For example, different thresholds may be determined for different occupations. In at least some approaches, a user profile is associated with the neck worn monitoring device and the user profile may be updated with the analyzed data and/or the recorded data.

Figure 5:
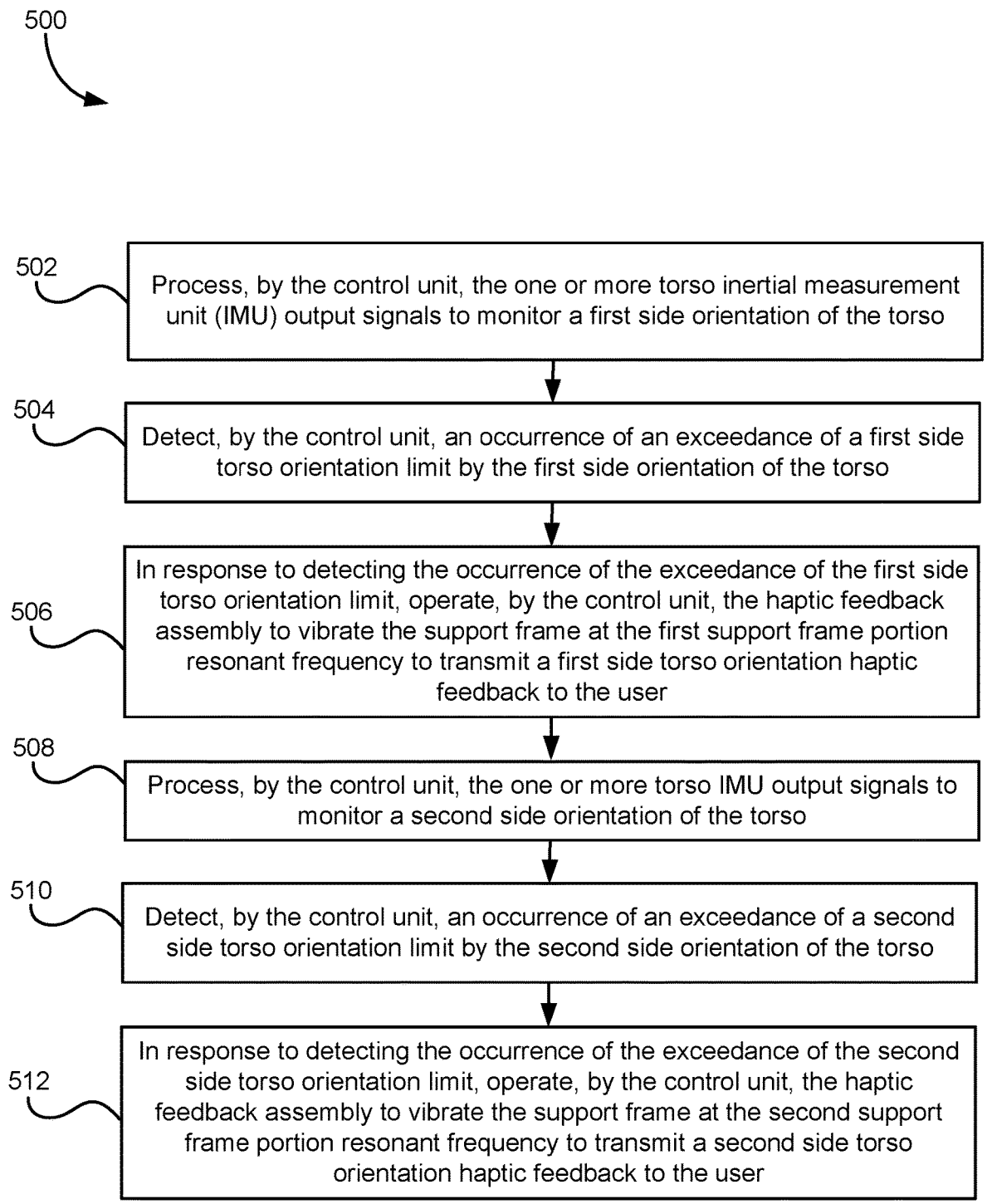
FIG. 5 is a flowchart of a method, in accordance with one aspect of the present disclosure.

FIG. 5 is a flowchart of process 500 for providing feedback to a user regarding a posture and/or an activity of the user where the support frame includes a first support frame portion having a first support frame portion resonant frequency. The support frame includes a second support frame portion which has a second support frame portion resonant frequency that is different from the first support frame portion resonant frequency. Process 500 may include more or less operations that those shown. At least some of the aspects described with respect to process 500 may be performed by the neck worn monitoring device 100 described in detail with reference to FIG. 1.

Process 500 includes operation 502. Operation 502 includes processing, by the control unit, the one or more torso IMU output signals to monitor a first side orientation of the torso. The output signals (e.g., sensor outputs) may be processed for detecting an occurrence of the first side orientation of the torso exceeding a first side torso orientation limit. In particular, each side of the neck worn monitoring device (e.g., each side of the support frame and/or each side of the flexible neck engagement member) may include a haptic feedback assembly, in at least some approaches. In at least some approaches, at least the support frame comprises a first support frame portion and a second support frame portion which divide the support frame in half (e.g., down the middle of the support frame) into the two portions. Each portion may be made of a different material having a different resonant frequency than the opposite portion, in at least some approaches. In other approaches, the haptic feedback assembly is able to output multiple frequencies where a different frequency is associated with a portion of the support frame and a corresponding side of the torso of a user.

The one or more torso IMU output signals may be received at the control unit of the neck worn monitoring device in at least some approaches. In other approaches, the one or more torso IMU output signals may be received via Bluetooth and/or Wi-Fi at an external control unit in any manner known in the art. In preferred aspects, torso IMU output signals are received at predetermined intervals. For example, torso neck IMU output signals may be received substantially continuously, periodically, randomly, etc.

Operation 504 includes detecting, by the control unit, an occurrence of an exceedance of a first side torso orientation limit by the first side orientation of the torso. In some aspects, sensors on the first side of the support frame output signals which are indicative of a first side torso orientation. The control unit is configured to process the output signals and determine whether the limit has been exceeded.

Operation 506 includes, in response to detecting the occurrence of the exceedance of the first side torso orientation limit, operating, by the control unit, the haptic feedback assembly to vibrate the support frame at the first support frame portion resonant frequency to transmit a first side torso orientation haptic feedback to the user. The first side torso orientation haptic feedback is indicative of the occurrence of the exceedance of the first side torso orientation limit by the first side orientation of the torso.

Operation 508 includes processing, by the control unit, the one or more torso IMU output signals to monitor a second side orientation of the torso. The output signals may be monitored for detection of an occurrence of the second side orientation of the torso exceeding a second side torso orientation limit. In particular, each side of the neck worn monitoring device (e.g., each side of the support frame and/or each side of the flexible neck engagement member) may include a haptic feedback assembly, in at least some approaches. In at least some approaches, at least the support frame comprises a first support frame portion and a second support frame portion which divide the support frame in half (e.g., down the middle of the support frame) into the two portions. Each portion may be made of a different material having a different resonant frequency than the opposite portion, in at least some approaches. In other approaches, the haptic feedback assembly is able to output multiple frequencies where a different frequency is associated with a portion of the support frame and a corresponding side of the torso of a user.

Operation 510 includes detecting, by the control unit, an occurrence of an exceedance of a second side torso orientation limit by the second side orientation of the torso. In some aspects, sensors on the second side of the support frame output signals which are indicative of a second side torso orientation. The control unit is configured to process the output signals and determine whether the limit has been exceeded.

Operation 512 includes, in response to detecting the occurrence of the exceedance of the second side torso orientation limit, operating, by the control unit, the haptic feedback assembly to vibrate the support frame at the second support frame portion resonant frequency to transmit a second side torso orientation haptic feedback to the user. The second side torso orientation feedback is indicative of the occurrence of the exceedance of the second side torso orientation limit by the second side orientation of the torso.

For example, the control unit may determine a location associated with the torso orientation limit where the location is associated with the sensor which provided the one or more torso output signals. Accordingly, process 500 may optionally include, in response to determining the location, providing modular haptic feedback. For example, torso output signals may be received from sensors located on the left side of the neck worn monitoring device. Haptic feedback may be correspondingly output to the left side of the neck worn monitoring device.

In preferred approaches, the first support frame portion is configured to vibrate a region of a first side of the neck to transmit the first side torso orientation haptic feedback to the user and the second support frame portion is configured to vibrate a region of a second side of the neck to transmit the second side torso orientation haptic feedback to the user.

Figure 6:
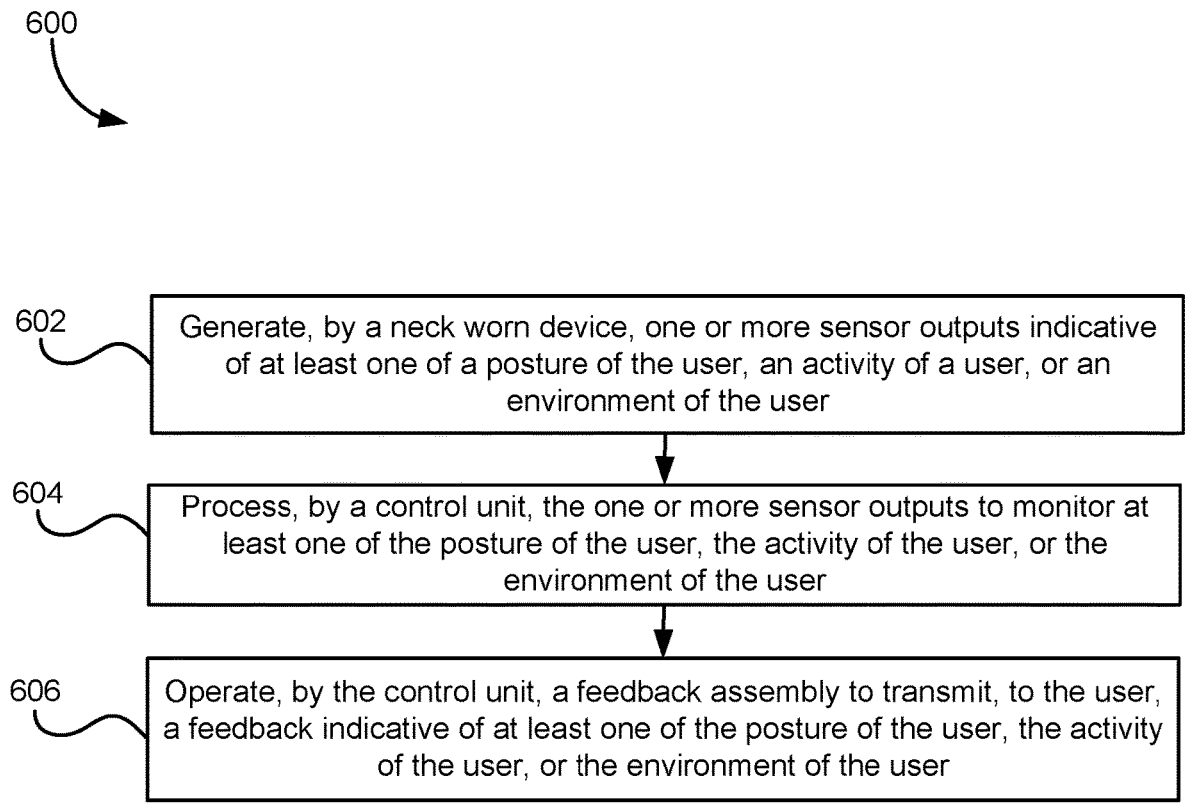
FIG. 6 is a flowchart of a method, in accordance with one aspect of the present disclosure.

FIG. 6 is a flowchart of process 600 for providing feedback to a user using a neck worn device. Process 600 may include more or less operations that those shown. At least some of the aspects described with respect to process 600 may be performed by the neck worn monitoring device 100 described in detail with reference to FIG. 1.

Process 600 includes operation 602. Operation 602 includes generating, by a neck worn device, one or more sensor outputs indicative of at least one of a posture of the user, an activity of a user, or an environment of the user. The neck work device comprises one or more sensors. The neck worn device may include any combination of sensors described herein. The one or more sensors are configured to output sensor outputs (e.g., output signals).

Operation 604 includes processing, by a control unit, the one or more sensor outputs to monitor at least one of the posture of the user, the activity of the user, or the environment of the user. The one or more sensor outputs may be indicative of an orientation of a torso of the user and the one or more sensor outputs are processed by the control unit to monitor the orientation of the torso. The control unit may be configured to detect an occurrence of an exceedance of a torso orientation limit by the orientation of the torso, as described in detail with respect to process 300.

Operation 606 includes operating, by the control unit, a feedback assembly to transmit, to the user, a feedback indicative of at least one of the posture of the user, the activity of the user, or the environment of the user. In response to detecting the occurrence of the exceedance of the torso orientation limit, the control unit may be configured to operate the feedback assembly to transmit a torso orientation feedback to the user, as described in detail with respect to process 300.

In various approaches the neck worn device comprises a support frame that extends at least partially around the neck of the user when the neck worn device is worn by the user. For example, the support frame conforms to the shoulders of the user around the neck of the user. In various approaches, the neck worn device comprises materials configured to adjust the fit of the neck worn device to the back region of the neck and/or the shoulders of the user.

In at least some aspects, the one or more sensor outputs comprise one or more support frame IMU outputs indicative of accelerations of the support frame. In preferred aspects, the three axes refer to the sagittal plane, the medial-lateral plane, and the posterior-anterior planes associated with movement. For example, movement may include bending to the left, bending to the right, bending forward, bending backward, etc. Movement may be absolute or relative. In one exemplary movement, a person may bend over to pick up a box and at the same time turn their head to look at something. Absolute movement includes the 90 degree bend forward of the torso and the 90 degree turn of the neck. Relative movement accounts for both movements such that the neck is determined to turn 20 degrees. The IMU outputs may comprise direction and velocity measurements of the support frame IMU in each of three axes (e.g., x, y, and z) for determining a location of the support frame IMU. The control unit processes the one or more support frame IMU outputs to monitor the orientation of the torso.

In at least some other aspects, the one or more sensor outputs are indicative of an orientation of a neck of the user. For example, the neck worn device may include a neck IMU that provides IMU outputs similar to the support frame IMU outputs described above. The one or more sensor outputs are processed by the control unit to monitor the orientation of the neck. The control unit monitors an orientation of the neck relative to the torso based on the orientation of the neck and the orientation of the torso to detect an occurrence of an exceedance of a neck to torso relative orientation by the orientation of the neck relative to the torso, as described in detail with respect to process 300. In response to detecting the occurrence of the exceedance of the neck to torso relative orientation limit, the control unit may operate the feedback assembly to transmit neck orientation feedback to the user.

In preferred approaches, the one or more sensor outputs comprises a heart rate sensor outputs activity data of the user comprises heart rate data for the user. The heart rate sensor output comprises photoplethysmography sensor output, in at least some aspects.

Physical activity data may be transmitted by the control unit to a remote device, according to any of the approaches described herein.

In one exemplary application, sensors mounted on the neck worn monitoring device according to at least some of the aspects described herein track body posture, body movement and dynamics, etc., for preventing injuries, especially at work. Data is generated accordingly. In response to various limits described herein being outside a safe threshold, the user may be provided an alert (e.g., haptic feedback, audio output, etc.). The skin-compliant flexible neck engagement member of the neck worn monitoring device isolates the neck movement from the torso movement of the user. By mounting two sensors, e.g., one on the flexible neck engagement member and one on the support frame, the neck worn monitoring device may be used to track neck and body posture and provide safety alerts for dynamic body movements (e.g., bending, twisting, etc.) and static postures (e.g., standing, sitting, etc.).

In another exemplary application, the neck worn monitoring device is used to track physical activity and workouts. The additional sensors may comprise at least the GSR and heart rate sensors. The sensors may be mounted to the neck worn monitoring device in a position providing skin contact for accurate measurements. In some approaches, the neck worn monitoring device outputs audio output including feedback on optimal heart rate for workouts (e.g., anaerobic zone, aerobic zone, fat burn zone, strength training, interval training, etc.). In other approaches, the sensors may acquire data about the user's activity level, physical condition, etc. In this exemplary application, an additional accessory fan, or a plurality of fans, may be provided.

In yet another exemplary application, a neck worn monitoring device as provided herein may be integrated with any smart home application known in the art. For example, the neck worn monitoring device may synchronize data with smart home devices for sharing physical activity data and/or providing personalized recommendations, with the consent of the user.

In yet another exemplary application, a neck worn monitoring device as provided herein may be used to assist those who are hard of hearing and/or vision impaired by providing haptic feedback as part of a safety alert.

Some or all of process 300, 400, 500, or 600 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 7:
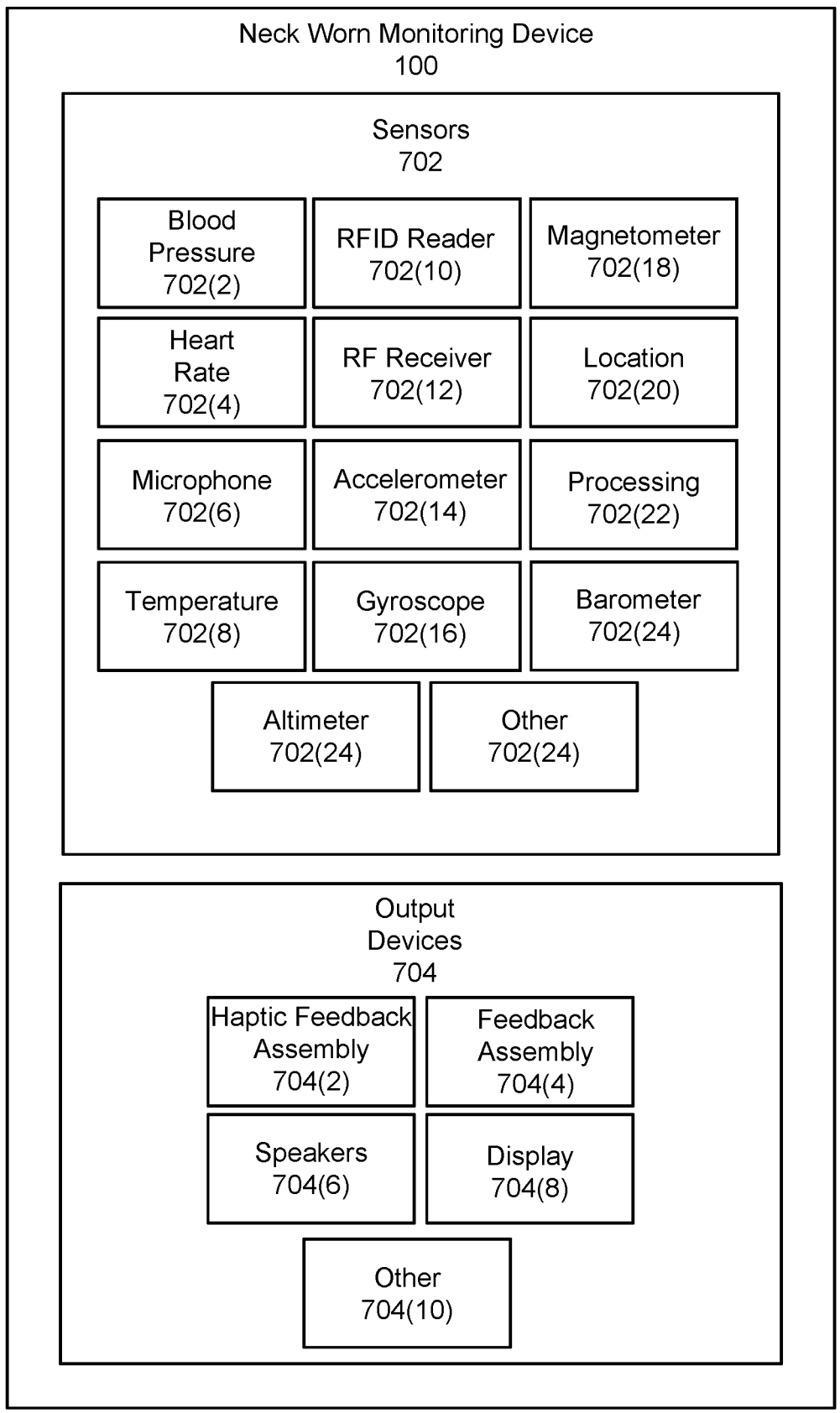
FIG. 7 is a block diagram of sensors and output devices of a neck worn monitoring device, in accordance with one aspect of the present disclosure.

FIG. 7 is a block diagram of sensors and output devices of the neck worn monitoring device including sensors 702 and output devices 704 of the neck worn monitoring device, e.g., such as neck worn monitoring device 100 as described in detail with respect to FIG. 1. The sensors 702 may generate sensor data during operation, according to any of the approaches described above and herein.

Any of the sensors 702 may be integrated with or internal to the neck worn monitoring device 100. For example, the sensors 702 may be built-in to the neck worn monitoring device during manufacture.

A blood pressure sensor 702(2) may gather sensor data associated with a user's blood pressure. For example, the blood pressure sensor 702(2) may comprise a camera that acquires images of blood vessels and determines the blood pressure by analyzing the changes in diameter of the blood vessels over time. In another example, the blood pressure sensor 702(2) may comprise a sensor transducer that is in contact with the skin of the user that is proximate to a blood vessel. The blood pressure sensor 702(2) may include a sensor transducer in some approaches.

A heart rate monitor 702(4) provides sensor data associated with a user's heart rate. For example, a heart rate monitor 702(4) may use one or more light emitting diodes (LEDs) and corresponding detectors to determine changes in apparent color of the blood of the user resulting from oxygen binding with hemoglobin in the blood, providing information about oxygen saturation. Changes over time in apparent reflectance of light emitted by the LEDs may be used to determine cardiac pulse.

At least one microphone 702(6) gathers audio input from a user and/or an environment surrounding the user. A microphone array may comprise a plurality of microphones 702(6).

A temperature sensor 702(8) provides sensor data associated with a temperature of a user and/or an environment surrounding the user. The temperature sensor 702(8) may measure the ambient air of the environment and/or the skin (e.g., body temperature of a user). In some implementations, a temperature sensor 702(8) includes an infrared detector configured to measure temperature using thermal radiation.

A sensor 702 may include a radio frequency identification (RFID) reader 702(10), near field communication (NFC) systems, etc., for communicating with radio frequency (RF) tags in the environment surrounding the user and/or the neck worn monitoring device 100.

The sensors may also include RF receivers 702(12). In some implementations, the RF receivers 702(12) may be part of transceiver assemblies. The RF receivers 702(12) may be configured to acquire RF signals associated with Wi-Fi, Bluetooth, ZigBee, Z-Wave, 3G, 4G, Long-Term Evolution (LTE), or other wireless data transmission technologies. The RF receivers 702(12) may provide information associated with data transmitted via radio frequencies, signal strength of RF signals, etc. For example, information from the RF receivers 702(12) may be used to facilitate determination of a location of the neck worn monitoring device 100.

In preferred aspects, the sensors 702 include at least one accelerometer 702(14). The at least one accelerometer 702 (14) provides sensor data associated with a direction and magnitude of an imposed acceleration, tilt relative to local vertical, etc. Sensor data may also include a rate of acceleration, determination of changes in direction, speed, tilt, etc.

In further preferred aspects, the sensors 702 include at least one gyroscope 702(16) which provides sensor data associated with rotation of the torso, the neck, etc., of a user. For example, the gyroscope 702(16) may indicate whether the neck and/or the torso has been rotated, a rate of rotation, a direction of rotation, etc.

In further preferred aspects, the sensors 702 include at least one magnetometer 702(18) which provides sensor data associated with an orientation by measuring ambient magnetic fields, such as the terrestrial magnetic field. For example, output from the magnetometer 702(18) may provide data that the neck worn monitoring device 100 (e.g., or the user wearing the neck worn monitoring device 100) has changed orientation or otherwise moved.

In various approaches, an IMU may include each of at least one accelerometer 702(14), at least one gyroscope 702(16), and at least one magnetometer 702(18).

A location sensor 702(20) is configured to provide sensor data associated with location information. The location may be relative or absolute. The location sensor 702(20) may be a GPS sensor in at least some preferred approaches.

In other aspects, processing sensors 702(22) may include hardware processors, memory, and other elements configured to perform various functions.

According to at least some aspects, the neck worn monitoring device 100 may include a barometer 702(24) for measuring atmospheric pressure and/or short term changes in the weather for providing a user with weather updates (e.g., for example, a user may speak (e.g., audio input) into a microphone 702(6) asking for weather updates, and, based at least in part on output signals from the barometer 702(24), the neck worn monitoring device 100 may provide the weather updates via the speaker 704(6) to be described in further detail below (e.g., audio output).

In various approaches, the neck worn monitoring device 100 may include an altimeter 702(26) for tracking changes in height. For example, an altimeter 702(26) may detect a user climbing stairs, hiking, squatting, jumping, etc. Any least some of the outputs from the altimeter 702(26) may be used in fitness tracking applications, such as for calorie calculations.

In yet other aspects, sensors 702 may include any other sensor 702(28) described herein. Any number or combination of any of the sensors described herein may be incorporated into the neck worn monitoring device 100.

The neck worn monitoring device 100 may include and/or be coupled to at least one output device 704. The output devices 704 generate signals which may be perceived by the user, detectable by the sensors 702, or a combination thereof. Any of the output devices 704 may be integrated with or internal to the neck worn monitoring device 100. For example, the output devices 704 may be built-into the neck worn monitoring device 100 during manufacture.

In preferred aspects, the neck worn monitoring device 100 includes at least one haptic feedback assembly 704(2) as described in detail above which provides a tactile sensation to the user. The haptic feedback assemblies 704(2) comprise piezoelectric or rotary motor devices configured to provide a vibration that may be felt by the user (e.g., a haptic feedback assembly as described in detail above).

In at least some approaches, additional feedback assemblies 704(4) may provide additional types of feedback including, but not limited to, additional audio, visual, tactile, etc., or any combination thereof. For example, the feedback assembly 704(4) may use one or more mechanisms such as electrical stimulation or mechanical displacement to provide the signal. For example, the feedback assembly 704(4) may generate a modulated electrical signal.

In various aspects, the neck worn monitoring device includes speakers 704(6) or other devices which output audio output including infrasonic sound, audible sound, ultrasonic sound, etc. The audio output devices 704(6) may comprise components configured to generate the acoustic output including, but are not limited to, the following: voice coils, piezoelectric elements, magnetorestrictive elements, electrostatic elements, etc.

In at least some aspects, the neck worn monitoring device may include a display device 704(8) to provide output that may be seen by the user. The output may be monochrome or color. The display devices 704(8) may be emissive, reflective, or both. The display device 704(8) may outputs images, non-image data such as text, numeric characters, colors, shapes, etc.

In yet other aspects, output devices 704 may include any output device 704(10) described herein.

Figure 8:
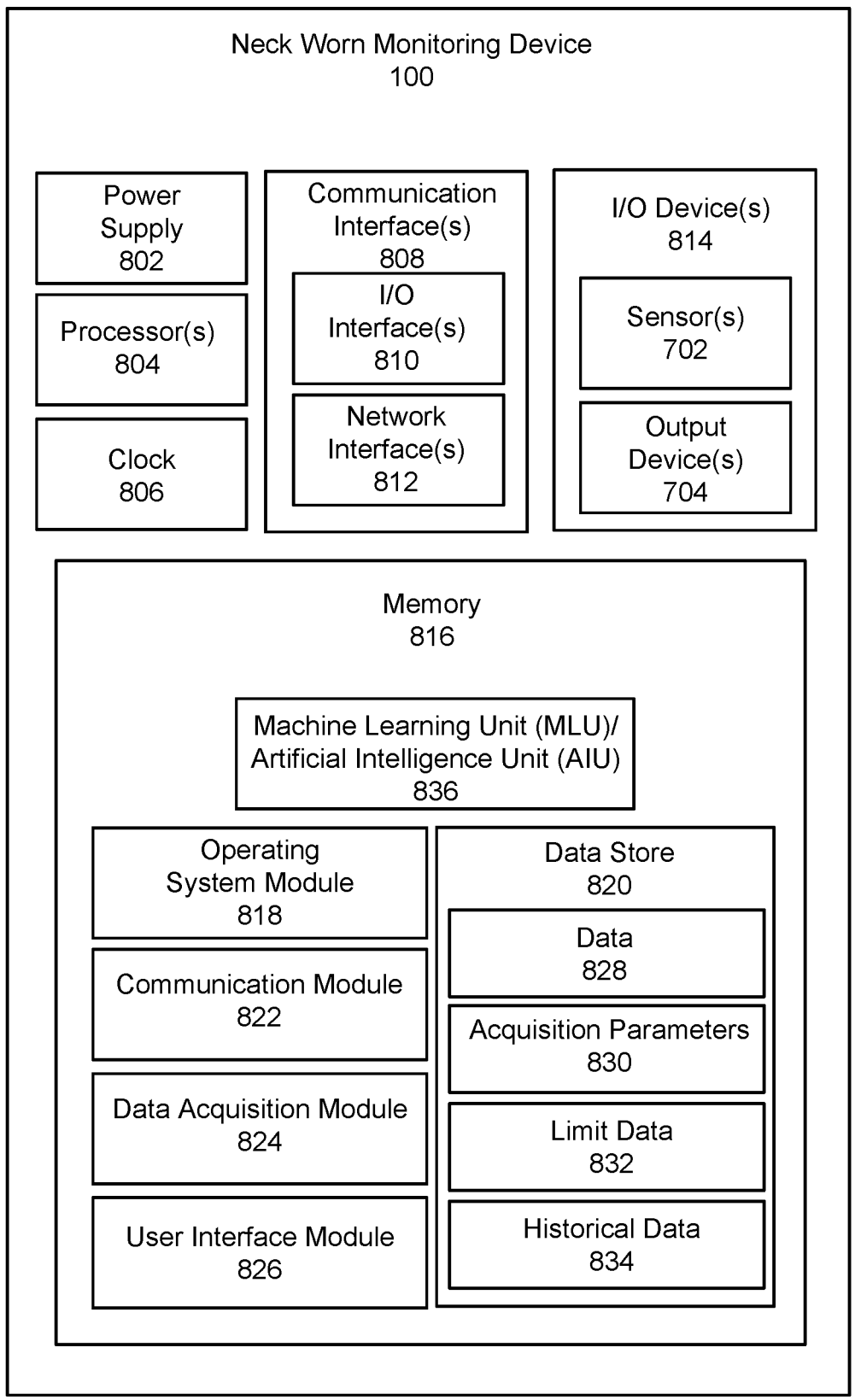
FIG. 8 is a block diagram of components of a control unit of a neck worn monitoring device, in accordance with one aspect of the present disclosure.

FIG. 8 is a block diagram of components a control unit of the neck worn monitoring device, e.g., such as control unit 106 of neck worn monitoring device 100 as described in detail with respect to FIG. 1.

One or more power supplies 802 are configured to provide electrical power suitable for operating the components in the neck worn monitoring device 100. In some implementations, the power supply 802 may comprise a rechargeable battery, fuel cell, photovoltaic cell, power conditioning circuitry, wireless power receiver, thermocouple, etc.

The neck worn monitoring device 100 may include one or more hardware processors 804 (processors) configured to execute one or more stored instructions. The processors 804 may comprise one or more cores. One or more clocks 806 may provide information indicative of date, time, ticks, etc. For example, the processor 804 may use data from the clock 806 to generate a timestamp, trigger a preprogrammed action, etc.

The neck worn monitoring device 100 may include one or more communication interfaces 808 such as input/output (I/O) interfaces 810, network interfaces 812, etc. The communication interfaces 808 enable the neck worn monitoring device 100, or components thereof, to communicate with other devices or components. The communication interfaces 808 may include one or more I/O interfaces 810. The I/O interfaces 810 may comprise interfaces such as Inter-Integrated Circuit (I2C), Serial Peripheral Interface bus (SPI), Universal Serial Bus (USB) as promulgated by the USB Implementers Forum, etc.

The I/O interface(s) 810 may couple to one or more I/O devices 814. The I/O devices 814 may include one or more of the sensors 702. The I/O devices 814 may also include output devices 704 such as speakers 704(4), a display 704(6), etc. In some embodiments, the I/O devices 814 may be physically incorporated with the neck worn monitoring device 100 or may be externally placed.

The network interfaces 812 are configured to provide communications between the neck worn monitoring device 100 and other devices, such as the sensors 702, routers, access devices, etc. The network interfaces 812 may include devices configured to couple to wired or wireless personal area networks (PANs), local area networks (LANs), wide area networks (WANs), etc. For example, the network interfaces 812 may include devices compatible with Ethernet, Wi-Fi, Bluetooth, ZigBee, 4G, 5G, LTE, etc.

The neck worn monitoring device 100 may also include one or more busses or other internal communications hardware or software that allow for the transfer of data between the various modules and components of the neck worn monitoring device 100.

The neck worn monitoring device 100 includes one or more memories 816. The memory 816 comprises one or more computer-readable storage media (CRSM). The CRSM may be any one or more of an electronic storage medium, a magnetic storage medium, an optical storage medium, a quantum storage medium, a mechanical computer storage medium, etc. The memory 816 provides storage of computer-readable instructions, data structures, program modules, and other data for the operation of the neck worn monitoring device 100. Various exemplary functional modules are shown stored in the memory 816, although the same functionality may alternatively be implemented in hardware, firmware, or as a system on a chip (SOC).

The memory 816 may include at least one operating system (OS) module 818. The OS module 818 is configured to manage hardware resource devices such as the I/O interfaces 810, the network interfaces 812, the I/O devices 814, and provide various services to applications or modules executing on the processors 804.

The memory 816 may also comprise a data store 820 and one or more of the following modules. These modules may be executed as foreground applications, background tasks, daemons, etc. The data store 820 may use a flat file, database, linked list, tree, executable code, script, or other data structure to store information. In some implementations, the data store 820 or a portion of the data store 820 may be distributed across one or more other devices.

A communication module 822 may be configured to establish communications with one or more of other devices, the sensors 702, etc. The communications may be authenticated, encrypted, etc. The communication module 822 may also control the communication interfaces 808.

The memory 816 may also store a data acquisition module 824. The data acquisition module 824 is configured to acquire sensor data. In some implementations the data acquisition module 824 may be configured to operate the one or more sensors 702, the microphone 702(6), etc. For example, the data acquisition module 824 may determine that the sensor data satisfies a trigger event. The trigger event may comprise values of sensor data for one or more sensors 702 exceeding a limit value.

In another example, the data acquisition module 824 on the neck worn monitoring device 100 may receive instructions from another device, such as a smart phone, to acquire sensor data at a specified interval, at a scheduled time, etc.

A user interface module 826 provides a user interface using one or more of the I/O devices 814. The user interface module 826 may be used to obtain input from the user, present information to the user, etc.

Data 828 may be stored in the data store 820. For example, the data 828 may comprise the sensor data, user preferences, etc.

One or more acquisition parameters 830 may be stored in the memory 816. The acquisition parameters 830 may specify operation of the data acquisition module 824, such as data sample rate, sample frequency, scheduling, etc.

Limit data 832 may be stored in the memory 816. For example, the limit data 832 may specify one or more thresholds used by the data acquisition module 824 to determine whether sensor data is to be retained or discarded.

The neck worn monitoring device 100 may maintain historical data 834. The historical data 834 may be used to provide information about trends or changes over time. For example, the historical data 834 may comprise data indicative of movement as measured by the accelerometer 702(14) over several hours or days.

A machine learning unit (MLU)/artificial intelligence unit (AIU) 836 may record and/or predict data obtained from the at least one sensor. The machine learning unit (MLU)/artificial intelligence unit (AIU) 836 may be of a type known in the art. In at least some approaches, the machine learning unit (MLU)/artificial intelligence unit (AIU) 836 may be used to set various of the limits described with respect to process 300, 400, 500, 600, etc. In at least some approaches, a machine learning unit (MLU)/artificial intelligence unit (AIU) 836 adjusts at least one limit based on the user, based on an occupation of the user, user habits, user environment, etc., or any combination thereof determined from a user profile associated with the user.

More or less components, modules, data, etc., may exist in the neck worn monitoring device 100.

Figure 9:
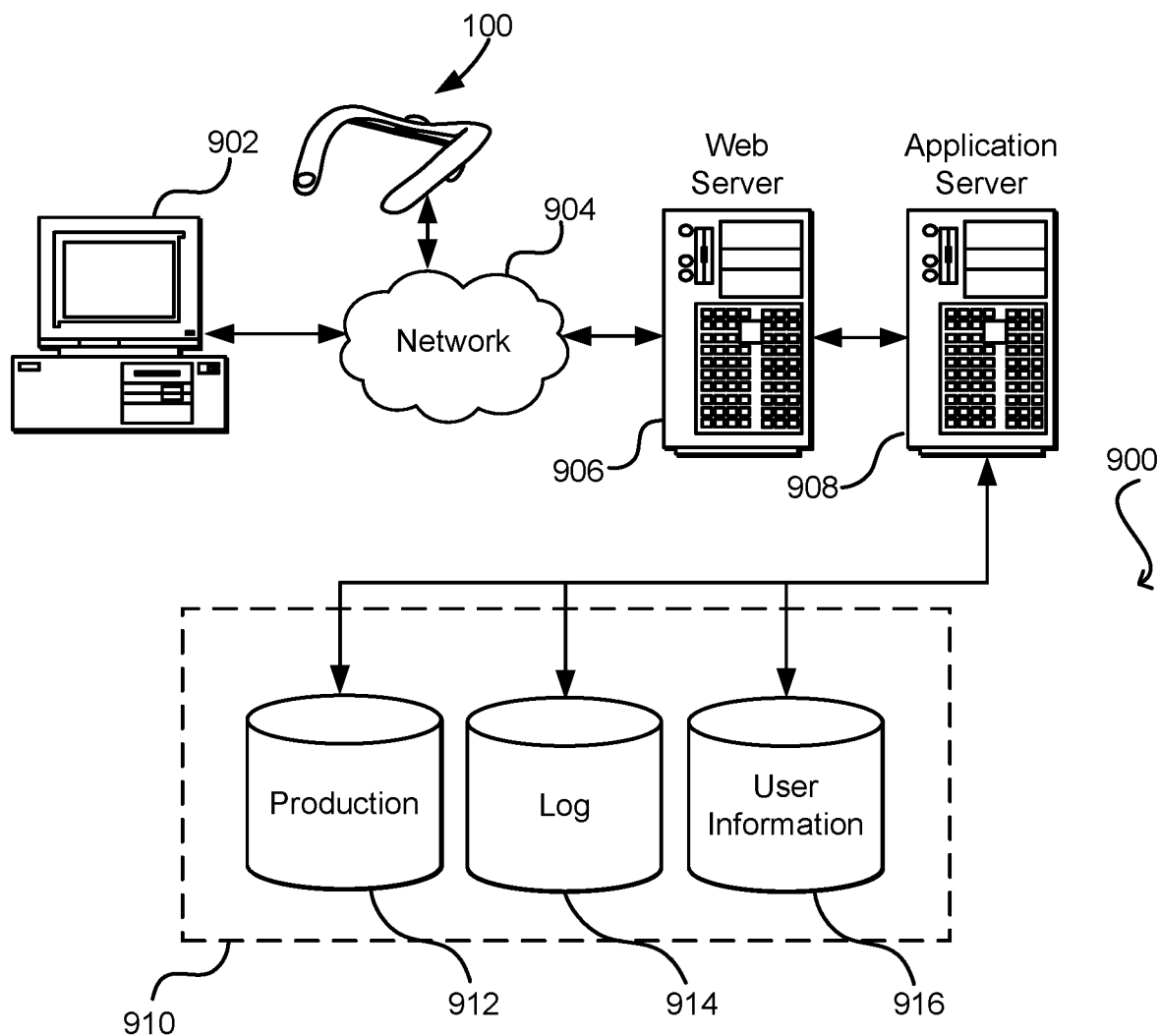
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. The environment includes the neck worn monitoring device 100 as described in detail above which, similarly to the client device 902, is operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected.

Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc., and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of providing haptic feedback to a user regarding a posture and/or an activity of the user, the method comprising:
   generating one or more torso inertial measurement unit (IMU) output signals indicative of movement of a torso of the user by a torso IMU mounted to a support frame of a neck worn device;
   engaging a neck of the user with a flexible neck engagement member of the neck worn device, wherein the flexible neck engagement member is mounted to the support frame;
   accommodating movement of the neck relative to the support frame by the flexible neck engagement member;
   processing, by a control unit, the one or more torso IMU output signals to monitor an orientation of the torso;
   detecting, by the control unit, an occurrence of an exceedance of a torso orientation limit by the orientation of the torso;
   in response to detecting the occurrence of the exceedance of the torso orientation limit, operating, by the control unit, a haptic feedback assembly to transmit a torso orientation haptic feedback to the user;
   generating one or more neck IMU output signals indicative of movement of the neck by a neck inertial measurement unit (IMU) mounted to the flexible neck engagement member;
   processing, by the control unit, the one or more neck IMU output signals to monitor an orientation of the neck;
   monitoring, by the control unit, an orientation of the neck relative to the torso based on the orientation of the neck and the orientation of the torso;
   detecting, by the control unit, an occurrence of an exceedance of a neck to torso relative orientation limit by the orientation of the neck relative to the torso; and
   in response to detecting the occurrence of the exceedance of the neck to torso relative orientation limit, operating, by the control unit, the haptic feedback assembly to transmit a neck orientation haptic feedback to the user,
   wherein:
   the support frame comprises a first support frame portion and a second support frame portion;
   the first support frame portion has a first support frame portion resonant frequency;
   the second support frame portion has a second support frame portion resonant frequency; and
   the second support frame portion resonant frequency is different than the first support frame portion resonant frequency.

2. The method of claim 1, wherein:
   the first support frame portion and the second support frame portion differ in at least one characteristic selected from the group consisting of: stiffness, composition, and density; and
   the second support frame portion resonant frequency being different than the first support frame portion resonant frequency is based at least in part on the at least one characteristic; and
   further comprising:
   processing, by the control unit, the one or more torso IMU output signals to monitor a first side orientation of the torso;
   detecting, by the control unit, an occurrence of an exceedance of a first side torso orientation limit by the first side orientation of the torso;
   in response to detecting the occurrence of the exceedance of the first side torso orientation limit, operating, by the control unit, the haptic feedback assembly to vibrate the support frame at the first support frame portion resonant frequency to transmit a first side torso orientation haptic feedback to the user for alerting the user to the exceedance of the first side torso orientation limit;
   processing, by the control unit, the one or more torso IMU output signals to monitor a second side orientation of the torso;
   detecting, by the control unit, an occurrence of an exceedance of a second side torso orientation limit by the second side orientation of the torso; and
   in response to detecting the occurrence of the exceedance of the second side torso orientation limit, operating, by the control unit, the haptic feedback assembly to vibrate the support frame at the second support frame portion resonant frequency to transmit a second side torso orientation haptic feedback to the user for alerting the user to the exceedance of the second side torso orientation limit.

3. The method of claim 1, further comprising processing, by the control unit, the one or more torso IMU output signals to generate activity data for the user indicative of an activity level of the user over a time span.

4. The method of claim 3, wherein the activity data comprises heart rate data for the user.

5. A method of providing feedback to a user, the method comprising:
   generating, by a neck worn device, one or more sensor outputs indicative of at least one of a posture of the user, an activity of a user, or an environment of the user, the one or more sensors being mounted to a support frame of the neck worn device;
   processing, by a control unit, the one or more sensor outputs to monitor at least one of the posture of the user, the activity of the user, or the environment of the user; and
   operating, by the control unit, a feedback assembly to transmit, to the user, a feedback indicative of at least one of the posture of the user, the activity of the user, or the environment of the user,
   wherein:
   the support frame comprises a first support frame portion and a second support frame portion;
   the first support frame portion has a first support frame portion resonant frequency;
   the second support frame portion has a second support frame portion resonant frequency; and
   the second support frame portion resonant frequency is different than the first support frame portion resonant frequency.

6. The method of claim 5, wherein:
   the one or more sensor outputs are indicative of an orientation of a torso of the user;
   the one or more sensor outputs are processed by the control unit to monitor the orientation of the torso; and
   further comprising:
   detecting, by the control unit, an occurrence of an exceedance of a torso orientation limit by the orientation of the torso; and
   in response to detecting the occurrence of the exceedance of the torso orientation limit, operating, by the control unit, the feedback assembly to transmit a torso orientation feedback to the user.

7. The method of claim 6, wherein:
the neck worn device comprises a support frame that extends at least partially around the neck of the user when the neck worn device is worn by the user;
the one or more sensor outputs comprise one or more support frame IMU outputs indicative of movement of the support frame; and
the control unit processes the one or more support frame IMU outputs to monitor the orientation of the torso.

8. The method of claim 6, wherein:
the one or more sensor outputs are indicative of an orientation of a neck of the user;
the one or more sensor outputs are processed by the control unit to monitor the orientation of the neck; and
further comprising:
monitoring, by the control unit, an orientation of the neck relative to the torso based on the orientation of the neck and the orientation of the torso;
detecting, by the control unit, an occurrence of an exceedance of a neck to torso relative orientation limit by the orientation of the neck relative to the torso; and
in response to detecting the occurrence of the exceedance of the neck to torso relative orientation limit, operating, by the control unit, the feedback assembly to transmit a neck orientation feedback to the user.

9. The method of claim 6, wherein:
the one or more sensor outputs are indicative of a first side orientation of the torso;
the one or more sensor outputs are processed by the control unit to monitor the first side orientation of the torso;
further comprising:
detecting, by the control unit, an occurrence of an exceedance of a first side torso orientation limit by the first side orientation of the torso; and
in response to detecting the occurrence of the exceedance of the first side torso orientation limit, operating, by the control unit, the feedback assembly to vibrate the support frame at the first support frame portion resonant frequency to transmit a first side torso orientation haptic feedback to the user;
the second support frame portion has a second support frame portion resonant frequency;
the one or more sensor outputs are indicative of a second side orientation of the torso;
the control unit to monitors the second side orientation of the torso; and
further comprising:
detecting, by the control unit, an occurrence of an exceedance of a second side torso orientation limit by the second side orientation of the torso; and
in response to detecting the occurrence of the exceedance of the second side torso orientation limit, operating, by the control unit, the feedback assembly to vibrate the support frame at the second support frame portion resonant frequency to transmit a second side torso orientation haptic feedback to the user.

10. The method of claim 5, further comprising processing, by the control unit, the one or more sensor outputs to generate activity data for the user indicative of an activity level of the user over a time span.

11. The method of claim 10, wherein:
the one or more sensor outputs comprises a heart rate sensor output; and
the activity data comprises heart rate data for the user.

12. The method of claim 11, wherein the heart rate sensor output comprises a photoplethysmography sensor output.

13. The method of claim 10, further comprising transmitting, by the control unit, the activity data to a remote device.

14. The method of claim 5, wherein the feedback assembly generates a haptic feedback that is transmitted to the user.

15. A neck worn monitoring device comprising:
a support frame shaped to be worn around a neck of a user;
a feedback assembly operable to output a feedback to the user;
one or more sensors configured to generate one or more sensor outputs indicative of at least one of a posture of the user, an activity of the user, or an environment of the user; and
a control unit configured to:
  process the one or more sensor outputs to monitor at least one of the posture of the user, the activity of the user, or the environment of the user; and
  operate the feedback assembly to transmit, to the user, a feedback indicative of at least one of the posture of the user, the activity of the user, or the environment of the user;
an additional sensor selected from the group consisting of: an ionization detector, a photoelectric detector, a heart rate sensor, galvanic skin response (GSR) sensor, a microphone, and a location sensor, and wherein the control unit is further configured to:
process one or more additional signals from the additional sensor; and
operate the feedback assembly to transmit a feedback that is based on the one or more additional signals from the additional sensor.

16. The device of claim 15, wherein:
the one or more sensor outputs are indicative of an orientation of a torso of the user; and
the control unit is further configured to:
process the one or more sensor outputs to monitor the orientation of the torso;
detect an occurrence of an exceedance of a torso orientation limit by the orientation of the torso; and
in response to detecting the occurrence of the exceedance of the torso orientation limit, operate the feedback assembly to transmit a torso orientation feedback to the user.

17. The device of claim 16, further comprising a flexible neck engagement member mounted to the support frame and configured to engage a back region of the neck when the neck worn monitoring device is worn around the neck, wherein the flexible neck engagement member is configured to accommodate movement of the neck relative to the support frame.

18. The device of claim 17, wherein:
the one or more sensor outputs are indicative of an orientation of a neck of the user; and
the control unit is further configured to:
process the one or more sensor outputs to monitor the orientation of the neck;
monitor an orientation of the neck relative to the torso based on the orientation of the neck and the orientation of the torso;
detect an occurrence of an exceedance of a neck to torso relative orientation limit by the orientation of the neck relative to the torso; and in response to detecting the occurrence of the exceedance of the neck to torso relative orientation limit, operate the feedback assembly to transmit a neck orientation feedback to the user.

19. The device of claim 15, wherein the control unit is further configured to:
process an audio input; and
operate the feedback assembly to transmit a feedback to the user that based at least in part on the audio input.

* * * * *